United States Patent
Gazzino et al.

(10) Patent No.: US 12,434,850 B2
(45) Date of Patent: Oct. 7, 2025

(54) METHOD FOR CONTROLLING A HYBRID POWER PLANT FOR A VEHICLE AND CONTROL ARCHITECTURE FOR SUCH A HYBRID POWER PLANT

(71) Applicant: AIRBUS HELICOPTERS, Marignane (FR)

(72) Inventors: Marc Gazzino, Marseilles (FR); Guillaume Dumur, Salon de Provence (FR); Jean-François Logeais, Marseilles (FR); Léonard Boudier, Aix-en-Provence (FR); Michel Jamot, Aix en Provence (FR); Mikaël Henaff, Aix en Provence (FR); Jérémy Camus, Ensues la Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/970,348

(22) Filed: Dec. 5, 2024

(65) Prior Publication Data
US 2025/0223049 A1 Jul. 10, 2025

(30) Foreign Application Priority Data
Jan. 8, 2024 (FR) .................. FR2400147

(51) Int. Cl.
*B64D 31/18* (2024.01)
*B64D 27/33* (2024.01)
*B64C 27/12* (2006.01)

(52) U.S. Cl.
CPC ............. *B64D 31/18* (2024.01); *B64D 27/33* (2024.01); *B64C 27/12* (2013.01)

(58) Field of Classification Search
CPC ............................... B64D 27/33; B64D 31/18
See application file for complete search history.

(56) References Cited

U.S. PATENT DOCUMENTS

| 2003/0001391 A1 | 1/2003 | Kuang et al. |
| 2008/0213034 A1 | 9/2008 | Wood et al. |

(Continued)

FOREIGN PATENT DOCUMENTS

| EP | 3034834 A1 | 6/2016 |
| EP | 3945035 A1 | 2/2022 |

(Continued)

OTHER PUBLICATIONS

French Search Report for French Application No. FR2400147, Completed by the French Patent Office, Dated Sep. 16, 2024, 10 pages.

*Primary Examiner* — Andrew H Nguyen
(74) *Attorney, Agent, or Firm* — BROOKS KUSHMAN P.C.

(57) ABSTRACT

A method for controlling a hybrid power plant of a vehicle provided with a heat engine and at least one electrical unit comprising an electric machine, an electrical energy source, and a power management unit, the heat engine and the at least one electric machine being mechanically connected to input shafts of a gearbox. After acquiring parameters of the at least one electrical unit, and receiving a mechanical power requirement of the vehicle, a usable electrical power that can be used by the electrical unit and at least one operating setpoint of the electrical unit are determined as a function of the parameters and the mechanical power requirement. Finally, the heat engine and the electrical unit are controlled as a function of the at least one operating setpoint in order to meet the mechanical power requirement.

20 Claims, 2 Drawing Sheets

(56) References Cited

U.S. PATENT DOCUMENTS

| | | |
|---|---|---|
| 2011/0121127 A1 | 5/2011 | Certain |
| 2012/0025032 A1 | 2/2012 | Hopdjanian et al. |
| 2016/0016670 A1 | 1/2016 | Sautreuil et al. |
| 2016/0167799 A1 | 6/2016 | Smaoui et al. |
| 2017/0174355 A1 | 6/2017 | Waltner et al. |
| 2017/0341518 A1 | 11/2017 | Murthy et al. |
| 2020/0309045 A1 | 10/2020 | Gomez |
| 2021/0359631 A1* | 11/2021 | Ives ................. H02P 23/14 |
| 2022/0081122 A1 | 3/2022 | Gazzino |
| 2024/0092497 A1 | 3/2024 | Thiriet et al. |
| 2024/0386810 A1 | 11/2024 | Lemay et al. |

FOREIGN PATENT DOCUMENTS

| | | |
|---|---|---|
| FR | 2952907 A1 | 5/2011 |
| FR | 2961767 A1 | 12/2011 |
| FR | 2962404 A1 | 1/2012 |
| FR | 3000468 A1 | 7/2014 |
| FR | 3023989 A1 | 1/2016 |
| FR | 3094314 A1 | 10/2020 |
| FR | 3114077 A1 | 3/2022 |
| FR | 3117450 A1 | 6/2022 |
| FR | 3126533 A1 | 3/2023 |
| FR | 3130253 A1 | 6/2023 |
| WO | 2016049027 A1 | 3/2016 |

* cited by examiner

METHOD FOR CONTROLLING A HYBRID POWER PLANT FOR A VEHICLE AND CONTROL ARCHITECTURE FOR SUCH A HYBRID POWER PLANT

CROSS REFERENCE TO RELATED APPLICATION

This application claims priority to FR 24 00147 filed on Jan. 8, 2024, the disclosure of which is incorporated in its entirety by reference herein.

TECHNICAL FIELD

The present disclosure lies in the technical field of hybrid power plants for vehicles and, more particularly, hybrid power plants for rotorcraft.

BACKGROUND

The disclosure relates to a method for controlling a hybrid power plant for propelling a vehicle and a control architecture for such a hybrid power plant. The disclosure also relates to a vehicle comprising such a hybrid power plant.

A vehicle may comprise one or more movement devices rotated by a power plant, possibly a hybrid power plant. For example, a rotorcraft is conventionally provided with one or more rotors capable of producing thrust. Such a rotor may comprise a lift rotor providing the lift, and indeed the propulsion, of the rotorcraft. Such a rotor may also comprise an auxiliary rotor, for example a rear rotor, in particular for opposing the yaw torque exerted by the lift rotor on the fuselage of the rotorcraft and controlling yaw movements of the rotorcraft.

Such a rotor may also comprise one or more propellers.

The power plant of a vehicle generally comprises one or more heat engines and at least one power transmission system arranged between the movement device or devices and the heat engine or engines. A distinction is made in particular between "single-engine" rotorcraft, wherein the power plant comprises a single heat engine for setting the movement device or devices in motion, and "twin-engine" rotorcraft, wherein the power plant has two heat engines for this purpose.

A power plant may possibly also comprise one or more electric motors for driving the movement device or devices. A power plant comprising at least one heat engine and at least one electric motor is generally referred to as a "hybrid power plant". A hybrid power plant also comprises one or more electrical energy sources such as a battery, a supercapacitor or a fuel cell, for example, in order to supply each electric motor with electrical energy. Some electrical energy sources may comprise rechargeable electrical energy storage devices.

An electric motor may be installed in different ways in a hybrid power plant.

An electric motor may in particular be connected to a power transmission system of the hybrid power plant. Such an electric motor may be connected, for example, to a specific input of a gearbox, or to an output of the gearbox, for example between the gearbox and a rotor of the rotorcraft, preferably the lift rotor.

Furthermore, an electric motor of a hybrid power plant may be used only in motor mode in order to convert electrical energy into mechanical energy for rotating each rotor. An electric motor may also be a reversible electric machine combining the motor mode with a generator mode in order to convert mechanical energy into electrical energy to charge a rechargeable electrical energy source or supply this electrical energy to an on-board electrical network of the rotorcraft.

For the sake of convenience, the term "heat engine" refers throughout the text to any heat engine that can be used in such a power plant for a rotorcraft, for example turboshaft engines or else piston engines. The term "heat engine" is used in contrast to the terms "electric motor" or "electric machine" that describe motors driven by electrical energy.

Depending on the operation of the hybrid power plant, the heat engines and the electric motors may be used separately or in combination, simultaneously or sequentially.

Document FR 2961767 describes a method for controlling a hybrid power plant of a vehicle comprising a single heat engine and an electric motor. During demanding operating phases, for example ascent phases, or when flying at high altitudes, this method makes it possible to reduce, or stop, the charging of an electric battery in order to maximize the power supplied by the hybrid power plant, i.e., supplied jointly by its heat engine and its electric motor, to propel the vehicle.

Furthermore, a rotorcraft whose power plant comprises a single heat engine is subject to certain restrictions in order to guard against risks arising from the failure of this single heat engine. Flying over certain urban zones may, for example, be prohibited for a rotorcraft whose power plant comprises a single heat engine, and authorized for a rotorcraft whose power plant comprises at least two heat engines.

Document FR 2952907 describes a hybrid power plant comprising a single heat engine, a main gearbox intended to drive a main rotor and a rear gearbox intended to drive an auxiliary rotor. A first electric motor is mechanically connected to the main gearbox and a second electric motor is mechanically connected to the rear gearbox. The electric motors provide additional mechanical energy to the heat engine during flight and help compensate for a failure of the heat engine, allowing the rotorcraft to continue flying for a limited time period. The electric motors may also operate in generator mode to transform mechanical energy supplied by the heat engine into electrical energy that is then stored in one or more electric batteries. These electric motors therefore make it possible to limit the power of each installed heat engine by intervening during demanding flight phases.

Document FR 3023989 relates to an electrical architecture of an aircraft comprising at least one lift rotor rotated by at least one heat engine via a mechanical gearbox, and a main electric machine directly connected to the heat engine, a secondary electric machine connected to a mechanical gearbox and at least one source of electricity. This electrical architecture is provided with a multifunction converter comprising a supervisor controlling the heat engine and controlling the electrical architecture to supply electricity to at least one electric machine and/or to draw electrical energy from at least one of the electric machines depending on operating phases of the aircraft.

Document FR 3114077 describes a method for managing a hybrid power plant for propelling a rotorcraft, the hybrid power plant comprising one or more heat engines, one or more electric machines and an electrical energy source. The method comprises acquiring one or more characteristics of the electrical energy source and/or the electric machines, determining the mechanical power requirement of the rotorcraft, and determining a distribution of power between the heat engines and the electric machines, depending on the characteristics of the electrical energy source and/or the electric machines and mechanical power requirement of the rotorcraft. Finally, the heat engines and the electric machines are controlled according to several operating modes, in order to charge the electrical energy source, provide mechanical power in addition to that of the heat engine or engines, or compensate for a heat engine failure.

Document WO 2016/049027 describes a method for controlling a hybrid drive system for a rotor of an aircraft comprising at least one heat engine, at least one electric motor and one electrical energy source. According to this method, a controller controls the heat engine and the electric motor as a function of a demand for power to be supplied to the rotor so that the heat engines and the electric motors jointly provide the power required to drive the rotor. This hybrid drive system therefore allows additional power to be supplied for a limited time period, in particular during an emergency phase or during dangerous or demanding flight phases.

Moreover, documents US 2003/0001391, EP 3945035, FR 3126533, EP 3034834, and US 2017/0341518 are also known. The technological background of the disclosure finally includes documents FR 3117450, FR 3000468, FR 2962404, FR 3130253, US 2017/0174355 and FR 3094314.

SUMMARY

The aim of the present disclosure is therefore to propose an alternative solution for controlling a hybrid power plant provided with a single heat engine for a vehicle in order to improve energy management and ensure supervision of the electrical part of this hybrid power plant.

The present disclosure relates firstly to a method for controlling a hybrid power plant for propelling a vehicle, this vehicle comprising:
  a hybrid power plant provided with a single heat engine, a gearbox, a controller of said heat engine, at least one electrical unit and one power management unit, said at least one electrical unit comprising an electric machine, an electrical energy source, a device for controlling the electric machine electrically connected to the electric machine, and to the electrical energy source, and sensors, the heat engine and said at least one electrical unit being mechanically connected respectively to input shafts of the gearbox; and
  a movement device connected by a mechanical transmission system to an output shaft of the gearbox.

The method according to the disclosure is remarkable in that it comprises the following steps:
  acquisition of at least one parameter of said at least one electrical unit by means of the sensors;
  reception of a mechanical power requirement of the vehicle by the power management unit;
  determination of a usable electrical power that can be used by said at least one electrical unit, as a function of said at least one parameter and the mechanical power requirement of the vehicle;
  establishment of at least one operating setpoint for said at least one electrical unit, by the power management unit, as a function of the usable electrical power, said at least one parameter and the mechanical power requirement; and
  controlling of the heat engine and said at least one electrical unit by means of the controller and the control device, respectively, as a function of said at least one operating setpoint, the usable power, said at least one parameter and the mechanical power requirement.

Therefore, the method according to the disclosure makes it possible to control the hybrid power plant and, in particular, the electric machine or machines, as a function of one or more parameters of said at least one electrical unit in order to optimize the management of the electrical energy of this electrical unit.

The vehicle may be an aircraft, for example, whose movement device is provided with at least one rotor, such as a lift rotor or a propeller, or an auxiliary rotor. The movement device is rotated by the hybrid power plant.

The hybrid power plant comprises a single heat engine and a controller for controlling and monitoring the heat engine. The controller can thus determine or estimate operating parameters of the heat engine. The controller is, for example, an EECU or Electronic Engine Control Unit, or a FADEC or Full Authority Digital Engine Control system.

The hybrid power plant comprises one or more electrical units each comprising an electric machine, an electrical energy source, comprising one or more rechargeable electrical energy storage devices, for example, and a control device electrically connected to the electric machine and to the electrical energy source.

An electrical unit also comprises sensors intended to monitor the electrical energy source and the electric machine. The sensors make it possible to measure one or more parameters or characteristics of the electrical unit, including at least one first characteristic of the electrical energy source and at least one second characteristic of the electric machine of the electrical unit.

The control device can be used to control and monitor the electric machine. The control device is, for example, electrically connected to the electric machine and to the electrical energy source and may be positioned between the electric machine and the electrical energy source.

The power management unit is connected to the control device relating to the electric machine of the electrical unit or units, to the sensors of this or these electrical units and to the controller of the heat engine, by wired or wireless links. If there are several electrical units, the power management unit can be used to distribute the overall power requirement between the different electrical units, and, therefore, between the different electric machines.

The power management unit may be dedicated to managing the hybrid power plant. Alternatively, the power management unit may be shared to perform other functions of the vehicle.

The power management unit may comprise a computer dedicated to carrying out the method according to the disclosure. This computer is connected, by wired or wireless links, to the control device of the electric machine or machines of the electrical unit or units, to the sensors of this or these electrical units and to the controller of the heat engine. The computer can therefore receive status information on the operating parameters of the heat engine and one or more parameters of the electrical unit or units in order to control, and indeed optimize, the operation of the hybrid power plant.

The electric machine of an electrical unit may operate in motor mode to transmit mechanical energy to the input shaft of the gearbox and in generator mode to supply electrical energy intended to charge the electrical energy source of the hybrid power plant, and possibly to supply an on-board network of the vehicle.

The gearbox is connected mechanically to the heat engine and to the electrical unit or units, via respective input shafts, and to the movement device by means of an output shaft and a mechanical transmission system.

Therefore, in the context of the method according to the disclosure, after acquiring at least one parameter of said at least one electrical unit by means of the sensors, the power management unit receives a mechanical power requirement of the vehicle. This mechanical power requirement is, for example, defined and transmitted by a device, that may be dedicated to this end, of the vehicle, in particular comprising a computer.

This mechanical power requirement is, for example, determined in a conventional manner by a computer of the vehicle, as a function of characteristics of the vehicle, such as its mass, its forward speed and the position of one or more control levers or handles, in particular. In the case of an aircraft, these characteristics of the vehicle may also comprise its altitude, its vertical speed, and/or the position of a lever for controlling the collective pitch, or the cyclic pitch, of the blades of a rotor of the aircraft.

The parameter or parameters of said at least one electrical unit comprise at least one first characteristic of the electrical energy source of the electrical unit and/or at least one second characteristic of the electric machine of the electrical unit. Said at least one first characteristic may be chosen, for example, from a charge level, a temperature, and the ageing of the electrical energy source. Said at least one second characteristic may be chosen from a temperature and an engine torque of the electric machine.

Next, a usable electrical power that can be used by said at least one electrical unit is determined by the computer, as a function of said at least one parameter and the mechanical power requirement of the vehicle. This usable electrical power may be positive, the electric machine of the electrical unit then generating mechanical power by using the electrical energy supplied by the electrical energy source in order to rotate the movement device, via the gearbox. Alternatively, this usable electrical power may be negative, the electric machine of the electrical unit then generating electrical power by using the mechanical energy supplied by the gearbox in order to electrically charge the electrical energy source, or supply electricity to other electrical consumers of the vehicle.

The electrical power that can be used by an electrical unit is linked to the state of the components of this electrical unit, i.e., to at least one first characteristic of the electrical energy source and/or to at least one second characteristic of the electric machine of this electrical unit. The electrical power that can be used by an electrical unit is therefore determined as a function of one or more parameters of this electrical unit.

For example, the usable electrical power is linked to the charge level and the temperature of the electrical energy source. Indeed, if the electrical energy source is a substantially charged battery and its temperature is lower than a predetermined threshold, the electrical energy source can deliver a first high level of power. When its charge level drops, the electrical voltage delivered by this electrical energy source drops until it reaches a minimum voltage limit, the usable electrical power then also being limited. Furthermore, when the battery supplies a high level of electrical power, its temperature increases and may reach a maximum limit above which its service life, and indeed its safety, is affected, with a risk of thermal runaway.

For the electric machine, it is mainly its temperature that affects the usable electrical power as a function of a maximum torque that can be delivered by the electric machine.

Next, at least one operating setpoint for said at least one electrical unit is established by the power management unit, as a function of this usable electrical power, said at least one parameter and the mechanical power requirement of the vehicle. This or these operating setpoints therefore make it possible to define the operating conditions of the electric machine and the electrical energy source in order for said at least one electrical unit to produce this usable electrical power. This or these operating setpoints may also influence the operation of the heat engine when said at least one electrical unit produces this usable electrical power.

Finally, the heat engine and said at least one electrical unit are controlled respectively by the controller and the control device, as a function of said at least one operating setpoint, said at least one parameter, and the mechanical power requirement, such that said at least one electrical unit produces the usable electrical power and, therefore, the hybrid power plant produces a mechanical power that meets the power requirement of the vehicle.

Therefore, the method according to the disclosure makes it possible to control the hybrid power plant to ensure the propulsion of the vehicle, optimizing the use of each electrical energy source while advantageously monitoring said at least one electrical unit and, in particular, the electrical energy source and the electric machine of said at least one electrical unit.

The method according to the disclosure may also include one or more of the following features, taken individually or in combination.

According to one possibility, when the usable electrical power is negative, controlling of the heat engine and of the at least one electrical unit may comprise a step of electrically charging the electrical energy source with an electric charging current generated by the electric machine, the electric machine being rotated by the input shaft of the gearbox. In this case, said at least one operating setpoint comprises a maximum electrical charging intensity setpoint for the electric charging current supplying the electrical energy source.

Therefore, the method according to the disclosure makes it possible to ensure that the electric charging current is compatible with the mechanical power requirement of the vehicle, the heat engine needing, for example, to supply sufficient mechanical power to meet this mechanical power requirement and allow the electric machine to deliver the electric charging current.

This maximum electrical charging intensity setpoint may also be established as a function of the electric current consumption of the vehicle. This electric current consumption is carried out by one or more pieces of equipment of the vehicle. This electric current is supplied by said at least one electrical unit and, in the present case, by the electric machine, and flows to the equipment of the vehicle via an on-board network of the vehicle.

The method may also comprise a check, by the power management unit, that the maximum electrical charging intensity setpoint is compatible with said at least one parameter of the electrical unit. For example, the power management unit checks that the electrical energy source can receive, or the electric machine can deliver, an electric current that complies with this maximum electrical charging intensity setpoint without risk of damage.

To this end, the power management unit can measure the value of the electrical intensity of the electric current delivered by the electric machine with a dedicated sensor and compare it with a predetermined threshold. The power management unit can then determine the delivered electrical power by multiplying this electrical intensity value by the electrical voltage at the terminals of the electric machine. The mechanical power supplied to the electric machine can finally be determined by taking into account the efficiency of this electric machine. Moreover, this predetermined threshold may be variable and linked, for example, to the charge level of the electrical energy source, in order to avoid overcharging it, in particular, or indeed to its temperature. Indeed, if the temperature of the electrical energy source is high, or too high, the electrical intensity of the electric charge current must be limited in order to prevent the internal temperature of the electrical energy source from increasing further.

Moreover, when this maximum electrical charging intensity setpoint is incompatible with said at least one parameter, this maximum electrical charging intensity setpoint may be limited by the power management unit. This maximum electrical charging intensity setpoint is incompatible with said at least one parameter when, for example, this maximum electrical charging intensity setpoint is greater than the maximum value of the electrical charging intensity allowed by this electrical energy source.

This maximum electrical charging intensity setpoint is also incompatible with said at least one parameter when the electrical intensity of the electric current used to charge the electrical energy source allows the hybrid power plant to generate, at the gearbox, mechanical power greater than a power setpoint allowed by this gearbox.

Furthermore, said method may also comprise the following additional steps:
  first determination, by the power management unit of said at least one electrical unit, of a limit value of allowable mechanical power allowed by the electric machine of said at least one electrical unit as a function of the maximum electrical charging intensity setpoint;
  second determination, by the power management unit, of a value of instantaneous mechanical charging power that the heat engine needs to generate as a function of the limit value of allowable mechanical power and the power requirement of the vehicle; and
  transmission, by the power management unit, to the controller of the heat engine, of the value of instantaneous mechanical charging power that the heat engine needs to generate.

Therefore, the controller can advantageously control the heat engine in order for it to supply sufficient total mechanical power to generate mechanical movement power transmitted to the movement device in order to meet the mechanical power requirement of the vehicle, and the instantaneous mechanical charging power transmitted to the electric machine to deliver the electric charging current to the electrical energy source.

According to another possibility compatible with the preceding possibilities, when said usable electrical power is positive, controlling of the heat engine and of the at least one electrical unit may comprise a step wherein mechanical drive power is generated by said at least one electrical unit, the electric machine of said at least one electrical unit being supplied with electricity by the electrical energy source of said at least one electrical unit, and said at least one operating setpoint for said at least one electrical unit comprises a torque setpoint for said electric machine.

In this case, the electric machine delivers a torque that complies with the torque setpoint in order to supply the mechanical drive power to the gearbox and, therefore, to the movement device.

This mechanical drive power may be supplied in addition to a mechanical power supplied by the heat engine in order for the electric machine and the heat engine to jointly rotate the output shaft of the gearbox. This additional power consisting of the mechanical drive power therefore improves the performances of the hybrid power plant, in order for the vehicle to perform a demanding maneuver, reduce its fuel consumption or help limit noise pollution and exhaust gas emissions, for example.

This mechanical drive power may also be supplied in order to compensate for a failure of the heat engine in order to allow the vehicle to continue its journey, for example in order to safely reach a landing area when the vehicle is an aircraft.

Moreover, the torque setpoint may also be established as a function of an electric current consumption of the vehicle. This electric current consumption is carried out by one or more pieces of equipment of the vehicle. This electric current is supplied by said at least one electrical unit and, in the present case, by the electrical energy source, and flows to the equipment of the vehicle via an on-board network of the vehicle.

The method may also comprise a calculation step, carried out by the power management unit of said at least one electrical unit, for calculating a value of electrical power available to supply the electric machine and a value of instantaneous mechanical drive power generated by the electric machine, as a function of the torque setpoint and said at least one parameter of said at least one electrical unit, and the transmission, by the power management unit to the controller of the heat engine, of this value of instantaneous mechanical drive power generated by the electric machine.

The controller of the heat engine can therefore adapt the mechanical power supplied by the heat engine in addition to the mechanical drive power supplied by the electric machine.

The value of electrical power available to supply the electric machine is calculated as a function of said at least one first characteristic of the electrical energy source, for example its charge level and its temperature, possibly defining the maximum electrical intensity of the electric current that the electrical energy source can deliver. The value of instantaneous mechanical drive power generated by the electric machine is then defined as a function of the value of available electrical power in order for the electric machine to deliver an engine torque that complies with the torque setpoint. The maximum engine torque that the electric machine can deliver in these conditions is directly proportional to the maximum electrical intensity of the electric current that the electrical energy source can supply to it.

According to another possibility compatible with the preceding possibilities, the method may comprise monitoring said at least one electrical unit, by means of the power management unit, and using the sensors of said at least one electrical unit, in order to monitor a speed of rotation and an engine torque of the electric machine, as well as an electrical intensity of an electric current flowing in said at least one electrical unit, in relation to limit values, respectively.

The speed of rotation and the engine torque of the electric machine are measured, for example, on a shaft of the electric machine, by sensors, and defined in relation to a casing of the electric machine. The electrical intensity of the electric current flowing in said at least one electrical unit may be measured at an input terminal of the electric machine, at an output terminal of the electrical energy source or indeed on an electric circuit of said electrical unit and, in particular, between the electric machine and the electrical energy source.

During this monitoring step, the speed of rotation and the engine torque of the electric machine, as well as the electrical intensity of the electric current flowing in said at least one electrical unit, may be compared to predetermined limit values, that may be variable as a function of said at least one parameter of said electrical unit, for example temperature and/or ageing. If one of these limit values is exceeded, said at least one operating setpoint of said at least one electrical unit may be reduced in order to comply with these limit values. The purpose of this monitoring step is to prevent damage to said at least one electrical unit, in particular the electric machine and the electrical energy source.

According to another possibility compatible with the preceding possibilities, the method may comprise a step of supplying electricity to an on-board network of the vehicle, via an electricity converter that said at least one electrical unit comprises. This electricity converter is electrically connected to the electrical energy source and to the on-board network. This electricity converter can therefore be used to transform the electric current supplied by the electrical energy source in order to supply electricity to the on-board network of the vehicle. The electricity converter can therefore modify the value of the electrical voltage and/or the electrical intensity of this electric current in order to supply the on-board network. The electricity converter can also transform direct electric current into alternating electric current, and vice versa.

This electricity converter may also be electrically connected to the control device, in addition to the electrical connections with the electrical energy source and the on-board network. The electricity converter can then transform the electric current supplied by the electric machine in order to supply electricity to the on-board network of the vehicle.

The object of the present disclosure is also a hybrid power plant for a vehicle, the hybrid power plant applying the method as described above.

Such a hybrid power plant comprises a single heat engine, a gearbox, a controller of the heat engine, and at least one electrical unit. This at least one electrical unit comprises an electric machine, an electrical energy source, a device for controlling the electric machine electrically connected to said electric machine and to the electrical energy source, a power management unit, and sensors intended to monitor the electrical energy source and the electric machine.

The heat engine and the electric machine of said at least one electrical unit are mechanically connected respectively to input shafts of the gearbox. The hybrid power plant may comprise a computer configured to implement the method described above.

Said at least one electrical unit may also comprise an electricity converter electrically connected to the electrical energy source and to an on-board network of the vehicle, or to the control device, in order to supply electricity to the on-board network with the electrical energy source and/or the electric machine.

The present disclosure finally relates to a vehicle comprising a hybrid power plant as described above and a movement device mechanically connected to an output shaft of said gearbox. This vehicle may be an aircraft or a rotorcraft, for example, and the movement device may comprise one or more rotors, such as a lift rotor and/or one or more propellers.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
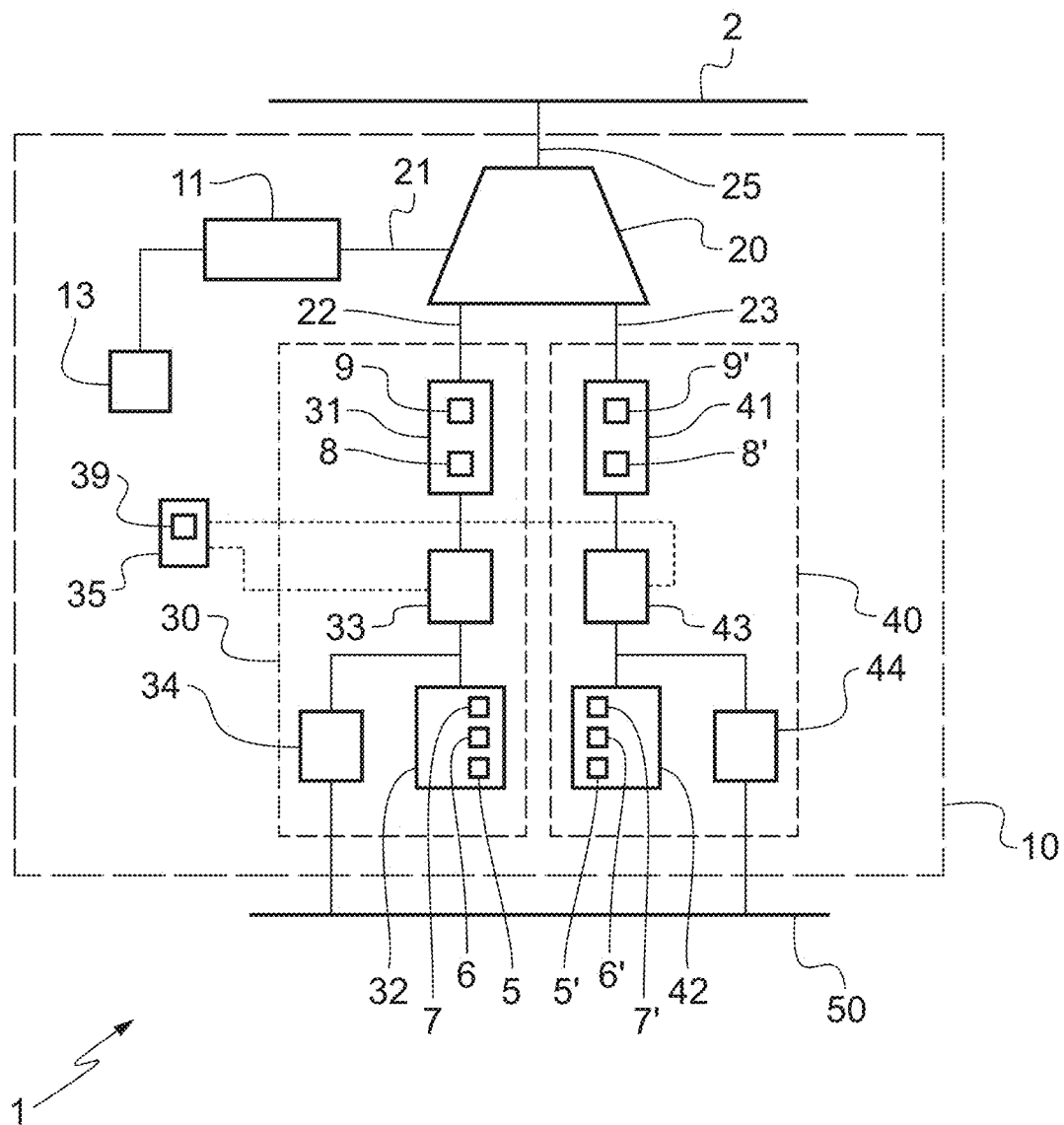
FIG. 1 is a view of a power plant according to the disclosure.

FIG. 1 shows a hybrid power plant 10 provided with a single heat engine 11, a gearbox 20, a controller 13 for controlling the heat engine 11, at least one electrical unit 30,40 and a power management unit 35. This hybrid power plant 10 is intended to equip a vehicle 1 in order to rotate a movement device 2. According to the example shown in FIG. 1, the vehicle 1 may be an aircraft or a rotorcraft whose movement device 2 comprises a lift rotor. Alternatively, or additionally, the movement device 2 may comprise one or more propellers.

According to the example shown in FIG. 1, the hybrid power plant 10 comprises two electrical units 30,40. Alternatively, a hybrid power plant 10 according to the disclosure may comprise a single electrical unit or more than two electrical units.

Such an electrical unit 30,40 comprises an electric machine 31,41, an electrical energy source 32, 42, a control device 33,43 controlling the electric machine 31, 41, and sensors 5, 5', 6, 6', 7, 7', 8, 8', 9, 9'. The control device 33, 43 controlling the electric machine 31, 41 is electrically connected to said electric machine 31, 41 and to the electrical energy source 32, 42, and makes it possible to manage the operation of the electric machine 31,41 and to transmit an electric current between the electric machine 31, 41 and the electrical energy source 32, 42.

The electrical energy source 32,42 may comprise one or more rechargeable electric batteries and/or one or more supercapacitors, for example.

The power management unit 35 makes it possible to manage the overall power in the hybrid power plant 10, and in particular to distribute the overall power requirement between the heat engine 11 and the electrical unit or units 30,40. If there are several electrical units 30,40, the power management unit 35 can be used, in particular, to distribute the overall power requirement between the electric machines 31, 41 of the different electrical units 30,40.

The power management unit 35 may be dedicated to managing the hybrid power plant 10, or be shared, also performing other functions of the vehicle 1. The power management unit 35 may be integrated into a computer of an avionics system of the vehicle 1 when the latter is an aircraft, for example.

In all cases, the power management unit 35 is connected via wired or wireless means to the controller 13, to the control device 33,43 of the electric machine 31, 41, and to the sensors.

Irrespective of whether there is a single electrical unit 30 or several electrical units 30,40, the heat engine 11 and the electric machine 31, 41 of each electrical unit 30,40 are mechanically connected respectively to input shafts 21, 22, 23 of the gearbox 20. The movement device 2 is connected by a mechanical transmission system to an output shaft 25 of this gearbox 20. Therefore, the heat engine 11 and the electric machine 31, 41 make it possible to rotate the movement device 2, via the gearbox 20.

Such an electrical unit 30,40 may also comprise an electricity converter 34,44 electrically connected to the electrical energy source 32, 42 and to an on-board network

50 of the vehicle 1. This electricity converter 34, 44 may transform a direct electric current into an alternating electric current or into another direct electric current, and vice versa, and may also modify the values of its electrical intensity and/or its electrical voltage. The electricity converter 34, 44 can therefore be used to transform the electric current supplied by the electrical energy source 32, 42 in order to supply electricity to the on-board network 50.

The electric machine 31, 41 may operate in motor mode to transform an electrical energy supplied by the source 32, 42, via the control device 33, 43, into mechanical energy transmitted to the input shaft 21, 22, 23 of the gearbox 20. The electric machine 31, 41 may also operate in generator mode to transform a mechanical energy supplied by the heat engine 11 and/or the movement device 2, via the gearbox 20, into electrical energy intended to charge the electrical energy source 32, 42, via the control device 33, 43, and possibly supply the on-board network 50 of the vehicle 1, via the electricity converter 34, 44.

The sensors 5, 5', 6, 6', 7, 7', 8, 8', 9, 9' of an electrical unit measure one or more parameters or characteristics of this electrical unit 30, 40. The sensors 5,5', 6, 6', 7, 7', 8, 8', 9, 9' may in particular be arranged respectively on or in the electrical energy source 32, 42 in order to measure the first characteristic or characteristics of the electrical energy source 32, 42, and on or in said electric machine 31, 41 in order to measure the second characteristic or characteristics of the electric machine 31, 41.

Such a sensor may supply a raw signal carrying raw measurements taken by this sensor. Such a sensor may also comprise an integrated computer in order to process these raw measurements, for example via conventional filtering or sampling, or the application of transformations, and supply a processed signal carrying these processed raw measurements.

For example, an electrical energy source 32, 42 may comprise a temperature sensor 5,5', possibly provided with a thermocouple, for measuring an internal temperature of the electrical energy source 32,42.

According to another example, an electrical energy source 32, 42 may comprise a charge sensor 6, 6' for measuring an electrical charge level of the electrical energy source 32, 42, i.e., the quantity of electrical energy that it comprises.

According to another example, an electrical energy source 32, 42 may comprise an ageing sensor 7,7' for measuring a level of ageing of the electrical energy source 32, 42. Such an ageing sensor may, for example, calculate the level of ageing of the electrical energy source 32, 42 as a function of internal parameters, such as its internal resistance and its charge level, for example. The level of ageing may be taken into account in order to determine the value of the maximum electrical intensity of the electric current that this electrical energy source 32, 42 can supply. The level of ageing can therefore be used to determine the reduction in the capacity of the electrical energy source 32, 42 to supply electrical energy or electrical power as a function of its use over time.

According to another example, an electric machine 31, 41 may comprise a temperature sensor 8, 8', possibly provided with a thermocouple, for measuring an internal temperature of the electric machine 31, 41. An electric machine 31, 41 may comprise a torque sensor 9, possibly provided with a torquemeter, for measuring an engine torque of the electric machine 31, 41.

The hybrid power plant 10 also comprises a computer 39 hosted by the power management unit 35 as shown in FIG. 1. By way of example, the computer 39 may comprise at least one processor and at least one memory, at least one integrated circuit, at least one programmable system, or at least one logic circuit, these examples not limiting the scope to be given to the term "computer". The term "processor" may refer equally to a central processing unit or CPU, a graphics processing unit or GPU, a digital signal processor or DSP, a microcontroller, etc. The computer 39 is thus connected via wired or wireless means to the controller 13, to the control device 33,43 of the electric machine 31, 41, and to the sensors 5, 5', 6, 6', 7, 7', 8, 8', 9, 9'.

In all cases, electrical, optical, analog or digital signals are exchanged between the computer 39 and the controller 13, the control device 33,43 of the electric machine 31, 41, and the sensors, and, if applicable, the power management unit 35.

Moreover, instructions or a computer program may be stored in a memory of the computer 39 or in a memory connected to this computer 39. The computer 39 may then execute these instructions or this program to implement a method for controlling the power plant 10.

Figure 2:
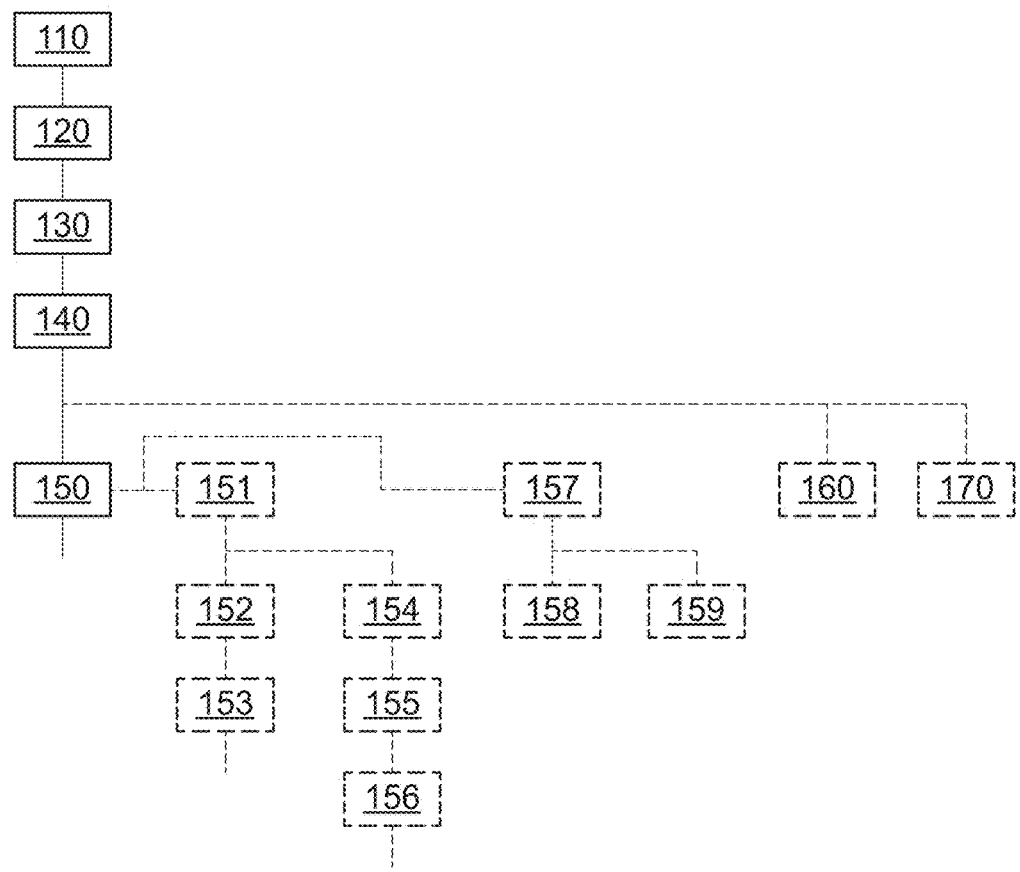
FIG. 2 is an overview diagram of a method according to the disclosure.

FIG. 2 shows an overview diagram of this method for controlling the hybrid power plant 10. This method may comprise the following steps.

The method first comprises the acquisition 110 of at least one parameter of said at least one electrical unit 30,40, carried out by means of the sensors.

Therefore, one or more first characteristics relating to the electrical energy source 32, 42 and one or more second characteristics relating to the electric machine 31, 41 are acquired. Signals carrying these parameters are, for example, transmitted by the sensors to the computer 39 or to the memory.

The first characteristics of the electrical energy source 32, 42 acquired during this acquisition step 110 can be used to define the current state of the electrical energy source 32, 42, and to deduce therefrom the energy capacity of the source 32, 42 to supply electrical energy, the quantity of electrical energy that the source 32, 42 can supply and, for example, the maximum electrical intensity of the electric current that the source 32, 42 can deliver. This current state of the electrical energy source 32, 42, its energy capacity, its quantity of electrical energy and the maximum electrical intensity of the electric current delivered or received by the electrical energy source 32, 42 may be determined using known algorithms as a function of one or more first characteristics and implemented by a system for managing the electrical energy source 32, 42 referred to as a battery management system or BMS.

The second characteristics of the electric machine 31, 41 acquired during this acquisition step 110 can also be used to define the quantity of electrical energy that the electric machine 31, 41 can use and to deduce therefrom the mechanical power that the electric machine 31, 41 can deliver in motor mode and the electrical energy that the electric machine 31, 41 can supply in generator mode. This quantity of electrical energy that the electric machine 31,41 can use, as well as the mechanical power that the electric machine 31, 41 can deliver in motor mode and the electrical energy that the electric machine 31, 41 can supply in generator mode, are defined when the electric machine 31, 41 is designed and may be put into the form of charts, mathematical laws or models as a function of one or more second characteristics.

Following this acquisition 110, the method comprises the reception 120, by the power management unit 35, of a mechanical power requirement of the vehicle 1. This power requirement may be determined in a conventional manner by a specific computer of the vehicle 1, such as a computer of an avionics system of the vehicle 1 when the latter is an aircraft, or by a dedicated device of vehicle 1. A signal carrying this information is then transmitted to the power management unit 35.

When the vehicle 1 is a rotorcraft provided with a main rotor, this mechanical power requirement is, for example, determined using mathematical laws, models and/or charts, as a function of the mass of the rotorcraft, its forward speed, its altitude, its vertical speed and values of the position of a lever controlling the collective pitch of blades of the main rotor 2, or the position of a lever controlling the cyclic pitch of these blades of the main rotor 2. These mathematical laws, models and/or charts are stored, for example, in a memory of the computer 39 or in a memory connected to this computer 39. The initial mass of the vehicle 1 is, for example, stored in a memory and the avionics system of the vehicle can determine the current mass of the vehicle by deducing from the initial mass the quantity of fuel consumed since the vehicle 1 took off. Dedicated sensors may provide the forward speed, the altitude and the vertical speed of the vehicle 1. Finally, sensors positioned on the pitch control levers provide the values of the corresponding controls.

The method next comprises the determination 130 of a usable electrical power that can be used by said at least one electrical unit 30,40, carried out by the computer 39 or the power management unit 35, as a function of the parameter or parameters of this electrical unit 30,40 and the mechanical power requirement of the vehicle 1.

This usable electrical power may be positive or negative. According to a sign assumption used here, a positive usable electrical power means that said at least one electrical unit 30,40 is capable of generating mechanical energy with the electric machine 31, 41 supplied with electricity by the source 32, 42. Conversely, a negative usable electrical power means that this electrical unit 30,40 is capable of generating electrical energy using the electric machine 31, 41 rotated by the heat engine 11 and/or by the propulsion device, via the gearbox 20.

A different sign assumption may also be used, reversing the meaning of a positive or negative usable electrical power.

The method also comprises the establishment 140 of at least one operating setpoint for said at least one electrical unit 30, 40, this operating setpoint being established by the power management unit 35, as a function of the usable electrical power, the parameter or parameters of this electrical unit 30, 40 and the mechanical power requirement.

This operating setpoint may also be established as a function of an electric current consumption of the vehicle 1, via the on-board network 50. This electric current consumed by the vehicle 1, and in particular by the electrical equipment of this vehicle 1, is supplied to the on-board network 50 by said at least one electrical unit 30,40, either by the electric machine 31, 41 operating in generator mode, or by the electrical energy source 32, 42 when its charge level allows. A measuring device positioned, for example, on the on-board network 50, can be used to determine the electrical intensity and/or the electrical voltage of this consumed electric current. The electrical equipment comprise, for example, an air-conditioning screens, system, a radio communication system, lights, hydraulic pumps, etc. A signal carrying the operating setpoint is transmitted to the control device 33,43 by the power management unit 35.

When said usable electrical power is negative, the operating setpoint comprises a maximum electrical charging intensity setpoint for an electric charging current likely to supply the electrical energy source 32, 42.

When said usable electrical power is positive, the operating setpoint comprises a torque setpoint likely to be transmitted by the electric machine 31, 41 to the input shaft 21,22,23 of the gearbox 20.

The method next comprises controlling 150 of the heat engine 11 and of said at least one electrical unit 30,40 by means of the controller 13 and the control device 33, 43, respectively, as a function of the operating setpoint, the parameter or parameters of this electrical unit 30,40 and the mechanical power requirement of the vehicle 1.

Therefore, when the usable electrical power is negative, controlling 150 of the heat engine 11 and of said at least one electrical unit 30,40 comprises a step of charging 151 the electrical energy source 32,42 of said at least one electrical unit 30,40 with an electric charging current generated by the electric machine 31, 41. The electric machine 31, 41 is then rotated by the input shaft 21, 22, 23 of the main gearbox 20, that transmits to it mechanical energy supplied by the heat engine 11 and/or the movement device 2. The electric machine 31, 41 then delivers an electric current whose electrical intensity is less than or equal to the maximum electrical charging intensity setpoint, and that supplies the electrical energy source 32,42 in order to electrically charge it. Some of this electric current delivered by the electric machine 31, 41 may possibly also supply the on-board network 50, if required.

The method according to the disclosure may also comprise a check 152, carried out by the power management unit 35, to check that this maximum electrical charging intensity setpoint is compatible with the parameter or parameters of the electrical unit or units 30,40. When this maximum electrical charging intensity setpoint is incompatible with the parameter or parameters, a limitation 153 is put in place by the power management unit 35 in order to modify and reduce this maximum electrical charging intensity setpoint.

The setpoint may be limited by a limiting function of the power management unit 35, for example in real time. Furthermore, this limiting function may be independent of the other functions of the power management unit 35, so as to prevent a failure or error common to the power management function and the limiting function from leading to limits being exceeded unintentionally.

The method according to the disclosure may also comprise the following additional steps:
i. first determination 154, carried out by the power management unit 35, of a limit value of mechanical power allowed by the electric machine 31, 41 as a function of the maximum electrical charging intensity setpoint;
ii. second determination 155, carried out by the power management unit 35, of a value of instantaneous mechanical charging power that the heat engine 11 needs to generate as a function of the limit value of allowable mechanical power and the power requirement of the vehicle 1; and
iii. transmission 156, carried out by the power management unit 35, to the controller 13 of the heat engine 11, of this value of instantaneous mechanical charging power that the heat engine needs to generate 11.

Therefore, the controller 13 can control the heat engine 11 in order for it to supply sufficient mechanical power to the gearbox 20 to ensure the propulsion of the vehicle 1, via the movement device 2, and charge the electrical energy source 32, 42.

Furthermore, when the usable electrical power is positive, said control 150 comprises the generation 157 of mechanical power by said at least one electrical unit 30,40. The electric machine 31, 41 of this or these electrical units 30,40 is then supplied with electricity by the source 32, 42 in order to supply engine torque to the input shaft 21, 22, 23 of the gearbox 20 to rotate the movement device 2 of the vehicle 1.

As a result, the electric machine 31, 41 can supply this mechanical power together with the mechanical power supplied by the heat engine 11 to rotate the movement device 2 via the gearbox 20 when the charge level of the electrical energy source 32, 42 allows. Such operation of the hybrid power plant 10 makes it possible, in particular, to improve the efficiency or the performances of the vehicle 1, for example in order to perform a demanding maneuver, reduce its fuel consumption or limit pollution emissions.

Figure 3:
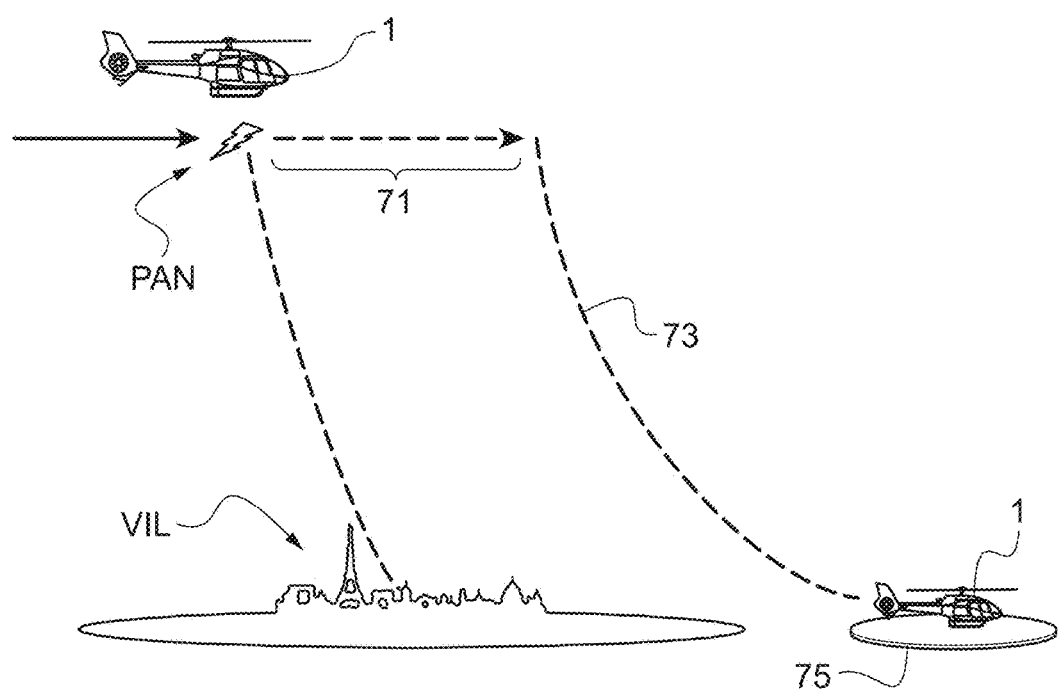
FIG. 3 is a view of an aircraft applying the method according to the disclosure.

The electric machine 31, 41 can supply this mechanical power in the event of a failure of the heat engine 11 and enable the vehicle to continue on its journey. Such operation, when the vehicle is a rotorcraft, is shown in FIG. 3.

When a failure PAN of the heat engine 11 occurs over an urban zone VIL, said at least one electrical unit 30,40, via the electric machine 31, 41, rotates the movement device 2 alone, via the gearbox 20, so as to allow the vehicle 1 to move away from the urban zone VIL during a flight 71. Once the vehicle 1 is no longer flying over the urban zone VIL, the vehicle 1 can begin an approach flight 73 towards a landing area 75 in order to safely reach this landing area 75.

The hybrid power plant 10 therefore helps increase the safety of use of the vehicle 1, in particular flight safety in the case of an aircraft, increasing its flight capacity, following a failure of the heat engine 11.

Moreover, the method according to the disclosure may comprise the calculation 158, carried out by the power management unit 35, of a value of available electrical power at the electrical energy source 32,42 for supplying the electric machine 31, 41 and a value of instantaneous mechanical power generated by the electric machine 31,41 as a function of the torque setpoint, the parameter or parameters of said at least one electrical unit 30,40 and this value of available electrical power. Next, a transmission step 159 is carried out by the power management unit 35 to transmit this value of instantaneous mechanical power generated by the electric machine 31,41 to the controller 13, in the form of a signal carrying such information.

Therefore, when the heat engine 11 has not failed, it can supply sufficient necessary power in addition to the instantaneous mechanical power generated by the electric machine 31, 41 in order for the heat engine 11 and the electric machine 31, 41 to rotate the movement device 2 together.

Furthermore, and irrespective of the value of the usable electrical power, the method according to the disclosure may comprise a monitoring step 160 for monitoring said at least one electrical unit 30,40, carried out by the power management unit 35 and using said sensors, in order to monitor a speed of rotation and an engine torque of said electric machine 31, 41, as well as an electrical intensity of an electric current flowing in this electrical unit 30,40, in relation to limit values, respectively. If a limit value is exceeded, the power management unit 35 can be used, for example by virtue of a monitoring function, to limit the corresponding setpoint value.

Finally, and once again irrespective of the value of the usable electrical power, the method according to the disclosure may comprise a step of supplying electricity 170 to an on-board network 50 of the vehicle 1, via the electricity converter 34, 44 of said at least one electrical unit 30,40.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A method for controlling a hybrid power plant for propelling a vehicle, the vehicle comprising:
 a hybrid power plant provided with a single heat engine, a gearbox, a controller of the heat engine, at least one electrical unit and one power management unit, the at least one electrical unit comprising an electric machine, an electrical energy source, a control device of the electric machine electrically connected to the electric machine and to the electrical energy source, and sensors, the heat engine and the at least one electrical unit being mechanically connected respectively to input shafts of the gearbox; and
 a movement device connected by a mechanical transmission system to an output shaft of the gearbox,
 wherein the method comprises the following steps:
 acquisition of at least one parameter of the at least one electrical unit by means of the sensors;
 reception of a mechanical power requirement of the vehicle by the power management unit;
 determination of usable electrical power that can be used by the at least one electrical unit, as a function of the at least one parameter and the mechanical power requirement of the vehicle;
 establishment of at least one operating setpoint for the at least one electrical unit, by the power management unit, as a function of the usable electrical power, the at least one parameter and the mechanical power requirement; and
 controlling of the heat engine and of the at least one electrical unit by means of the controller and the control device, respectively, as a function of the at least one operating setpoint, the at least one parameter and the mechanical power requirement.

2. The method according to claim 1,
 wherein, when the usable electrical power is negative, controlling of the heat engine and of the at least one electrical unit comprises electrically charging the electrical energy source of the at least one electrical unit with an electric charging current generated by the electric machine of the at least one electrical unit, the electric machine being rotated by the input shaft of the gearbox, and the at least one operating setpoint for the at least one electrical unit comprises a maximum electrical charging intensity setpoint for the electric charging current.

3. The method according to claim 2,
 wherein the maximum electrical charging intensity setpoint is also established as a function of an electric current consumption of the vehicle, the electric current consumed by the vehicle being supplied by the at least one electrical unit.

4. The method according to claim 2,
 wherein the method comprises a check, by the power management unit, that the maximum electrical charging intensity setpoint is compatible with the at least one parameter and, when the maximum electrical charging intensity setpoint is incompatible with the at least one parameter, a limitation of the maximum electrical charging intensity setpoint is put in place.

5. The method according to claim 2, wherein the method comprises:

a first determination, by the power management unit of the at least one electrical unit, of a limit value of mechanical power allowed by the electric machine as a function of the maximum electrical charging intensity setpoint;
a second determination, by the power management unit, of a value of instantaneous mechanical charging power that the heat engine needs to generate as a function of the limit value of allowable mechanical power and the power requirement of the vehicle; and
a transmission, by the power management unit to the controller of the heat engine, of the value of instantaneous mechanical charging power that the heat engine needs to generate.

6. The method according to claim 1,
wherein, when the usable electrical power is positive, controlling of the heat engine and of the at least one electrical unit comprises generating of mechanical power by the at least one electrical unit, the electric machine of the at least one electrical unit being supplied with electricity by the source of the at least one electrical unit, and the at least one operating setpoint for the at least one electrical unit comprises a torque setpoint for the electric machine.

7. The method according to claim 6,
wherein the torque setpoint is also established as a function of an electric current consumption of the vehicle, the electric current consumed by the vehicle being supplied by the at least one electrical unit.

8. The method according to claim 6,
wherein the method comprises a calculation, by the power management unit of the at least one electrical unit, of a value of electrical power available to supply the electric machine and a value of instantaneous mechanical power generated by the electric machine as a function of the torque setpoint and the at least one parameter of the at least one electrical unit, and transmission, by the power management unit to the controller of the heat engine, of the value of instantaneous mechanical power generated by the electric machine.

9. The method according to claim 1,
wherein the method comprises monitoring of the at least one electrical unit, by the power management unit and using the sensors, in order to monitor a speed of rotation and an engine torque of the electric machine, as well as an electrical intensity of an electric current flowing in the at least one electrical unit, in relation to limit values, respectively.

10. The method according to claim 1,
wherein the at least one parameter of the at least one electrical unit comprises at least one first characteristic of the electrical energy source and at least one second characteristic of the electric machine.

11. The method according to claim 10,
wherein the at least one first characteristic of the electrical energy source is chosen from a charge level, a temperature and an ageing of the electrical energy source and the at least one second characteristic of the electric machine is chosen from a temperature and an engine torque of the electric machine.

12. The method according to claim 1,
wherein the mechanical power requirement of the vehicle is determined as a function of one or more of the following values:
an altitude of the vehicle;
a forward speed of the vehicle;
a vertical speed of the vehicle;
a value of a position of a lever controlling the collective pitch of blades of a main rotor; and
a value of a position of a lever controlling a cyclic pitch of blades of the main rotor.

13. The method according to claim 1,
wherein the method comprises a step of supplying electricity to an on-board network of the vehicle, via an electricity converter of the at least one electrical unit, the electricity converter being electrically connected to the electrical energy source and to the on-board network.

14. A hybrid power plant intended for a vehicle, the hybrid power plant comprising a single heat engine, a gearbox, a controller of the heat engine, and at least one electrical unit, the at least one electrical unit comprising an electric machine, an electrical energy source, a control device of the electric machine electrically connected to the electric machine and to the electrical energy source, a power management unit, and sensors, the heat engine and the at least one electrical unit being mechanically connected respectively to input shafts of the gearbox,
wherein the hybrid power plant comprises a computer configured to implement the method according to claim 1.

15. The hybrid power plant according to claim 14,
wherein the at least one electrical unit comprises at least one electricity converter electrically connected to the control device, to the electrical energy source and to an on-board network of the vehicle, in order to supply electricity to the on-board network with the electrical energy source and/or the at least one electric machine.

16. A vehicle comprising the hybrid power plant and a movement device mechanically connected to an output shaft of the gearbox, the hybrid power plant being according to claim 14.

17. A method for controlling a hybrid power plant for propelling a vehicle, the vehicle comprising:
a hybrid power plant having a single heat engine, a gearbox, a controller of the heat engine, an electrical unit and a power management unit, the electrical unit comprising an electric machine, an electrical energy source, a control device of the electric machine electrically connected to the electric machine and to the electrical energy source, and sensors, the heat engine and the electrical unit mechanically connected respectively to input shafts of the gearbox; and
a movement device connected by a mechanical transmission system to an output shaft of the gearbox,
wherein the method comprises the following steps:
acquisition of a parameter of the electrical unit by the sensors;
reception of a mechanical power requirement of the vehicle by the power management unit;
determination of usable electrical power that can be used by the electrical unit, as a function of the parameter and the mechanical power requirement of the vehicle;
establishment of an operating setpoint for the electrical unit, by the power management unit, as a function of the usable electrical power, the parameter and the mechanical power requirement; and
controlling of the heat engine and of the electrical unit by the controller and the control device, respectively, as a function of the operating setpoint, the parameter and the mechanical power requirement.

18. The method according to claim 17,
wherein, when the usable electrical power is negative, controlling of the heat engine and of the electrical unit comprises electrically charging the electrical energy source of the electrical unit with an electric charging current generated by the electric machine of the electrical unit, the electric machine being rotated by the input shaft of the gearbox, and the operating setpoint for the electrical unit comprises a maximum electrical charging intensity setpoint for the electric charging current.

19. The method according to claim 18, wherein the maximum electrical charging intensity setpoint is also established as a function of an electric current consumption of the vehicle, the electric current consumed by the vehicle being supplied by the electrical unit.

20. The method according to claim 18, wherein the method comprises a check, by the power management unit, that the maximum electrical charging intensity setpoint is compatible with the parameter and, when the maximum electrical charging intensity setpoint is incompatible with the parameter, a limitation of the maximum electrical charging intensity setpoint is put in place.

\* \* \* \* \*